March 29, 1966  A. KURTI ETAL  3,243,126
VARIABLE AREA EXHAUST NOZZLE
Original Filed Jan. 4, 1961  6 Sheets-Sheet 1
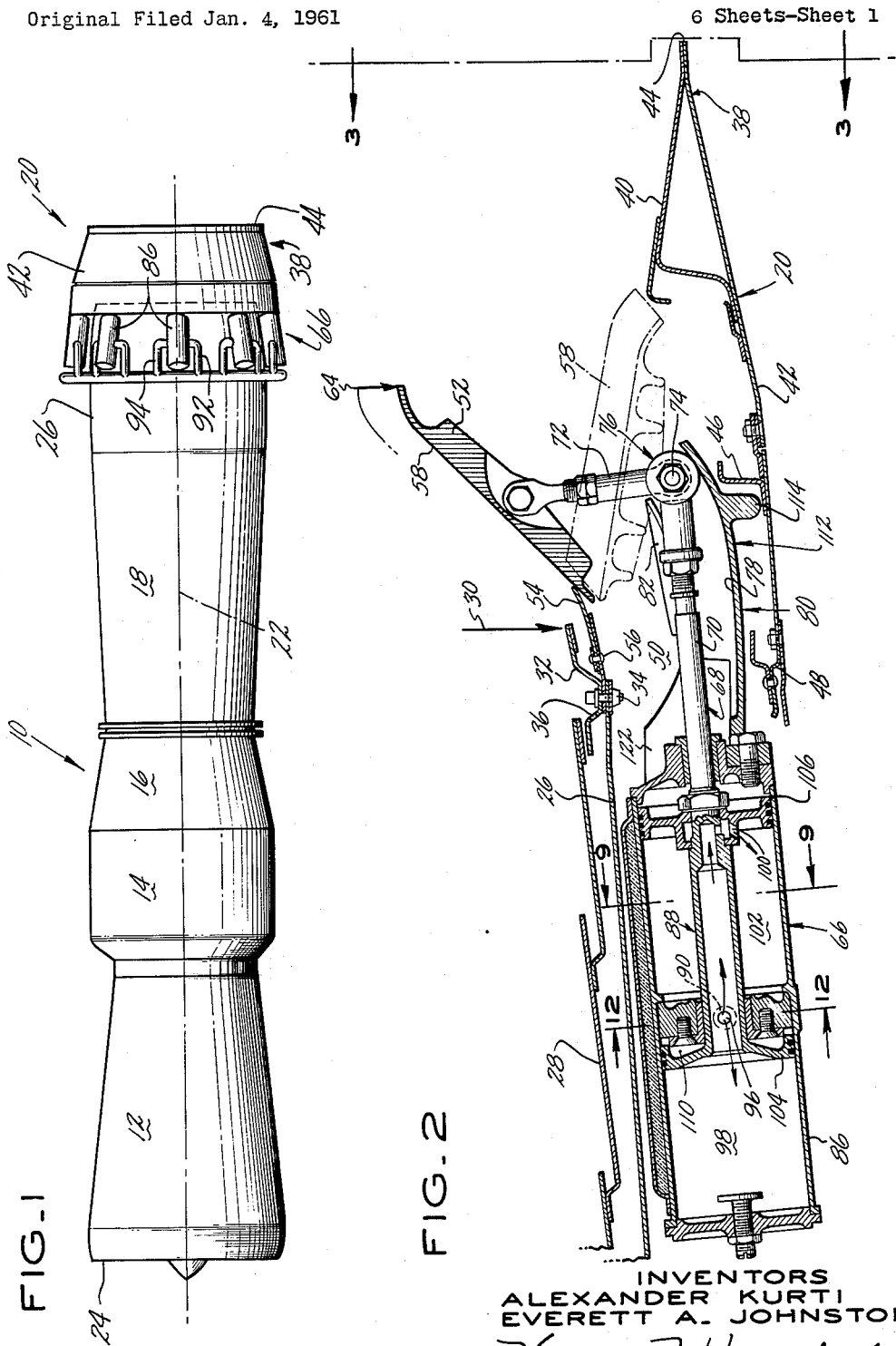
INVENTORS
ALEXANDER KURTI
EVERETT A. JOHNSTON
BY Vernon F. Hauschild
ATTORNEY

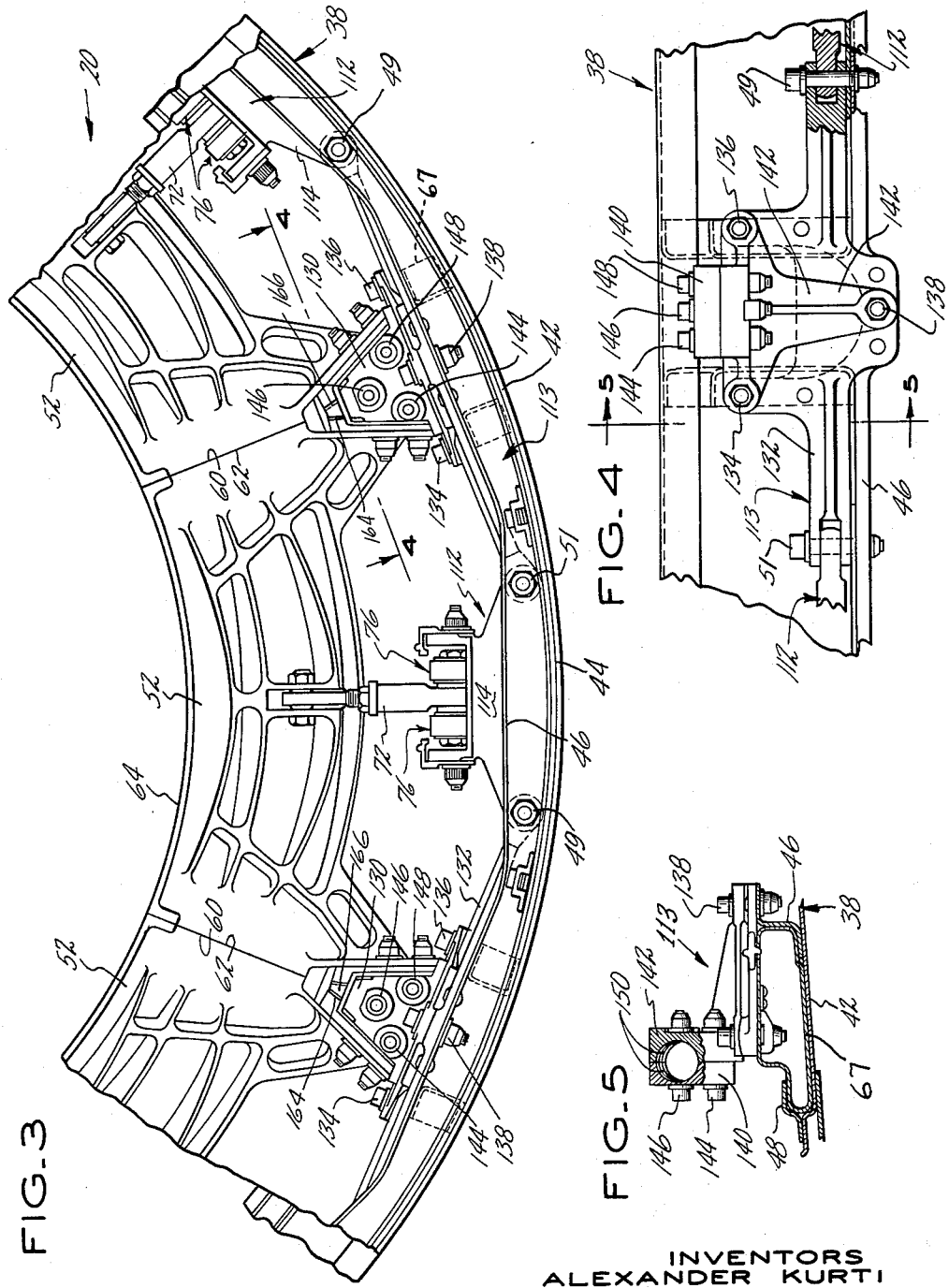

March 29, 1966     A. KURTI ETAL     3,243,126
VARIABLE AREA EXHAUST NOZZLE

Original Filed Jan. 4, 1961     6 Sheets-Sheet 3

INVENTORS
ALEXANDER KURTI
EVERETT A. JOHNSTON
BY Vernon F. Hauschild
ATTORNEY

March 29, 1966  A. KURTI ETAL  3,243,126
VARIABLE AREA EXHAUST NOZZLE
Original Filed Jan. 4, 1961  6 Sheets-Sheet 4
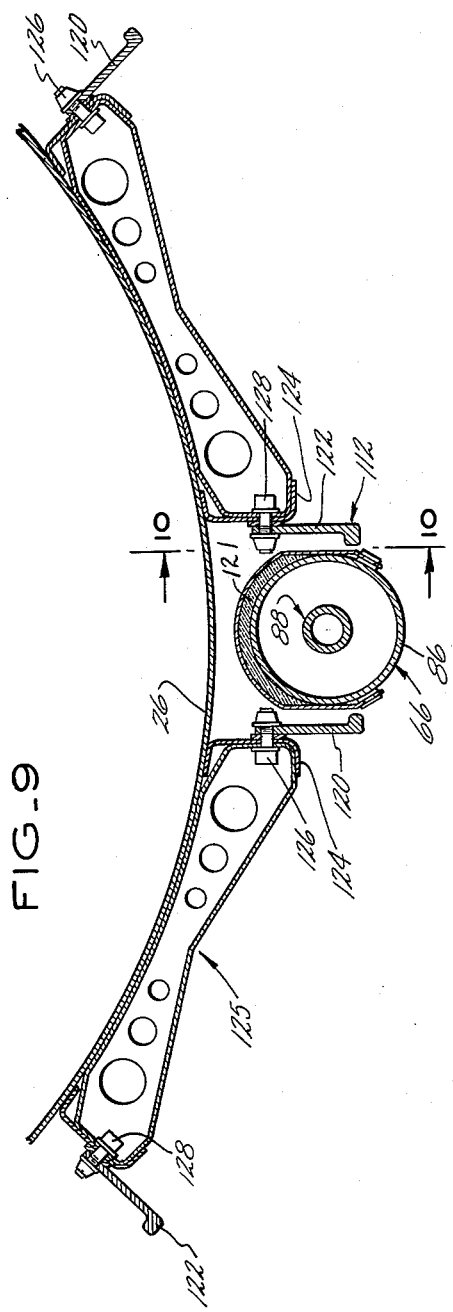
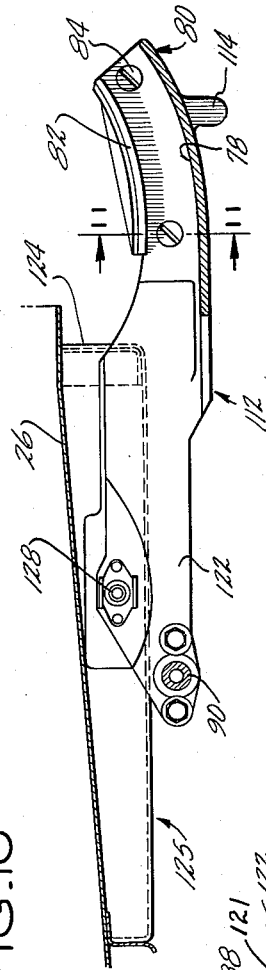
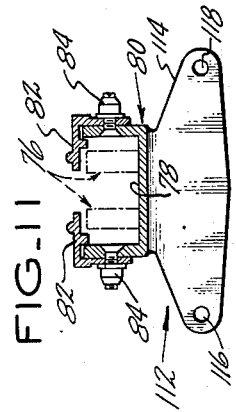
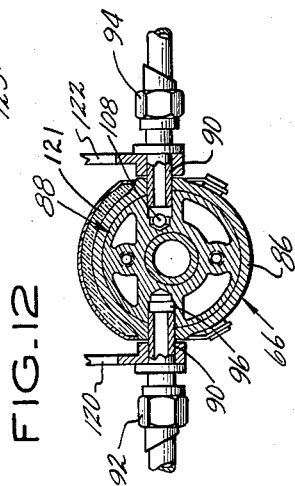
INVENTORS
ALEXANDER KURTI
EVERETT A. JOHNSTON
BY *Vernon F. Hauschild*
ATTORNEY March 29, 1966 A. KURTI ETAL 3,243,126
VARIABLE AREA EXHAUST NOZZLE
Original Filed Jan. 4, 1961 6 Sheets-Sheet 5
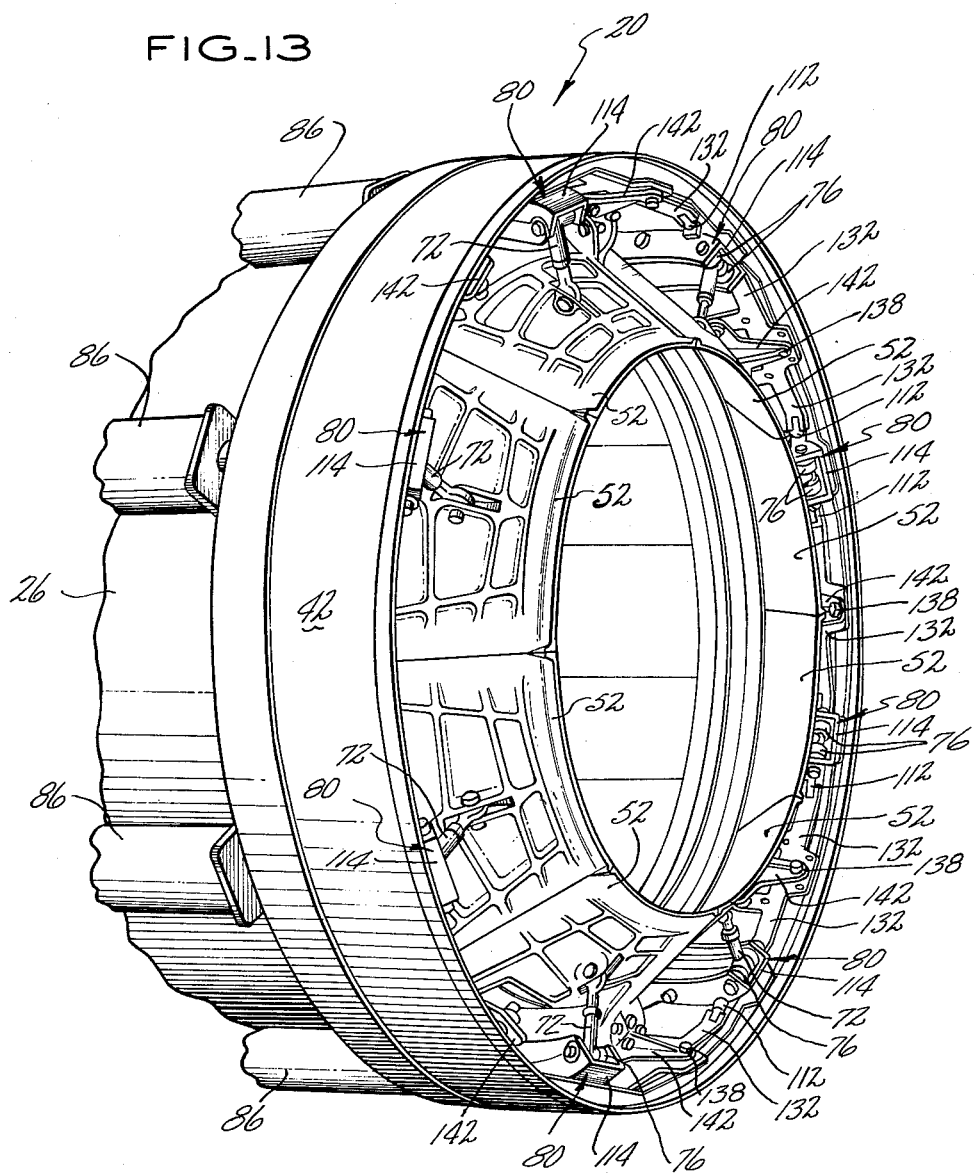
FIG_13
INVENTORS
ALEXANDER KURTI
EVERETT A. JOHNSTON
BY Vernon F. Hauschild
ATTORNEY March 29, 1966  A. KURTI ETAL  3,243,126
VARIABLE AREA EXHAUST NOZZLE
Original Filed Jan. 4, 1961  6 Sheets-Sheet 6

INVENTORS
ALEXANDER KURTI
EVERETT A. JOHNSTON
BY Vernon F. Hauschild
ATTORNEY

United States Patent Office 3,243,126
Patented Mar. 29, 1966

3,243,126
VARIABLE AREA EXHAUST NOZZLE
Alexander Kurti, West Hartford, Conn., and Everett A. Johnston, Springfield, Mass., assignors to United Aircraft Corporation, East Hartford, Conn., a corporation of Delaware
Continuation of application Ser. No. 80,582, Jan. 4, 1961. This application Sept. 18, 1963, Ser. No. 310,192
8 Claims. (Cl. 239—265.39)

This is a continuation application of United States patent application Serial No. 80,582 on improvements in Exhaust Nozzles, by Alexander Kurti and Everett A. Johnston, filed January 4, 1961, now abandoned.

It is an object of this invention to teach a variable area exhaust nozzle which is so shaped and which has pivotal flaps actuatable so that the exhaust nozzle is either convergent or convergent-divergent.

It is a further object of this invention to teach a variable area exhaust nozzle which is light in weight and which is capable of withstanding high operating temperatures.

It is a further object of this invention to teach a variable area exhaust nozzle in which the exhaust nozzle flaps and the flap support and actuating means are flexibly supported from the exhaust duct to permit substantial relative thermal expansion therebetween.

It is a further object of this invention to teach an exhaust nozzle wherein cooling air may be passed over the flap actuating and support means.

It is a further object of this invention to teach an exhaust nozzle which can be removed from the engine by the removal of a few accessible bolts.

Other objects and advantages will be apparent from the specification and claims and from the accompanying drawings which illustrate an embodiment of the invention.

FIG. 1 is an external view of a modern aircraft engine which generates thrust by discharging exhaust gases to atmosphere and which utilizes our exhaust nozzle;

FIG. 2 is an enlarged cross-sectional showing of the exhaust nozzle depicted in FIG. 1;

FIG. 3 is a partial showing of the exhaust nozzle shown in FIG. 2 as viewed from line 3—3;

FIG. 4 is a developed view taken along line 4—4 of FIG. 3 with the exhaust nozzle flaps and unison gears removed to show the exhaust nozzle flap support mechanism more clearly;

FIG. 5 is a view, partially broken away, as viewed from line 5—5 of FIG. 4;

FIG. 9 is an enlarged view taken substantially along line 9—9 of FIG. 2;

FIG. 10 is a view as seen from line 10—10 of FIG. 9;

FIG. 11 is a view as seen from line 11—11 of FIG. 10;

FIG. 12 is a view taken along line 12—12 of FIG. 2 to illustrate the mechanism by which the flap support and actuating means are pivotally attached to the exhaust gas duct;

FIG. 13 is a perspective showing of the exhaust nozzle with the flaps closed.

Figure 6:
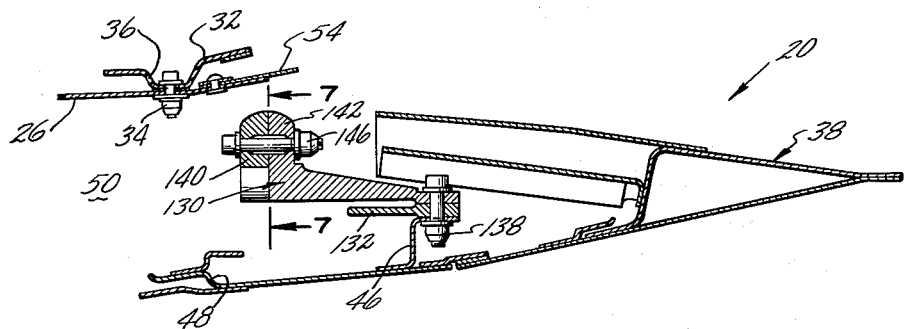
FIG. 6 is a cross-sectional view similar to FIG. 2 but in a position between flaps to illustrate the structure to which the flaps are pivotally attached.
Figure 7:
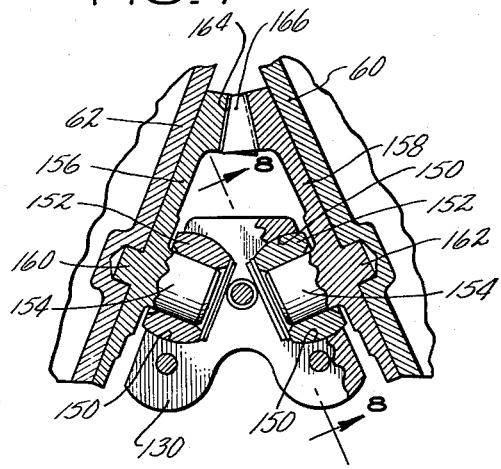
FIG. 7 is an enlarged view taken along line 7—7 of FIG. 6.
Figure 8:
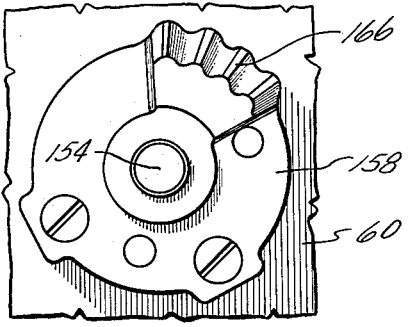
FIG. 8 is a showing of the unison ring as viewed from line 8—8 of FIG. 7.
Figure 14:
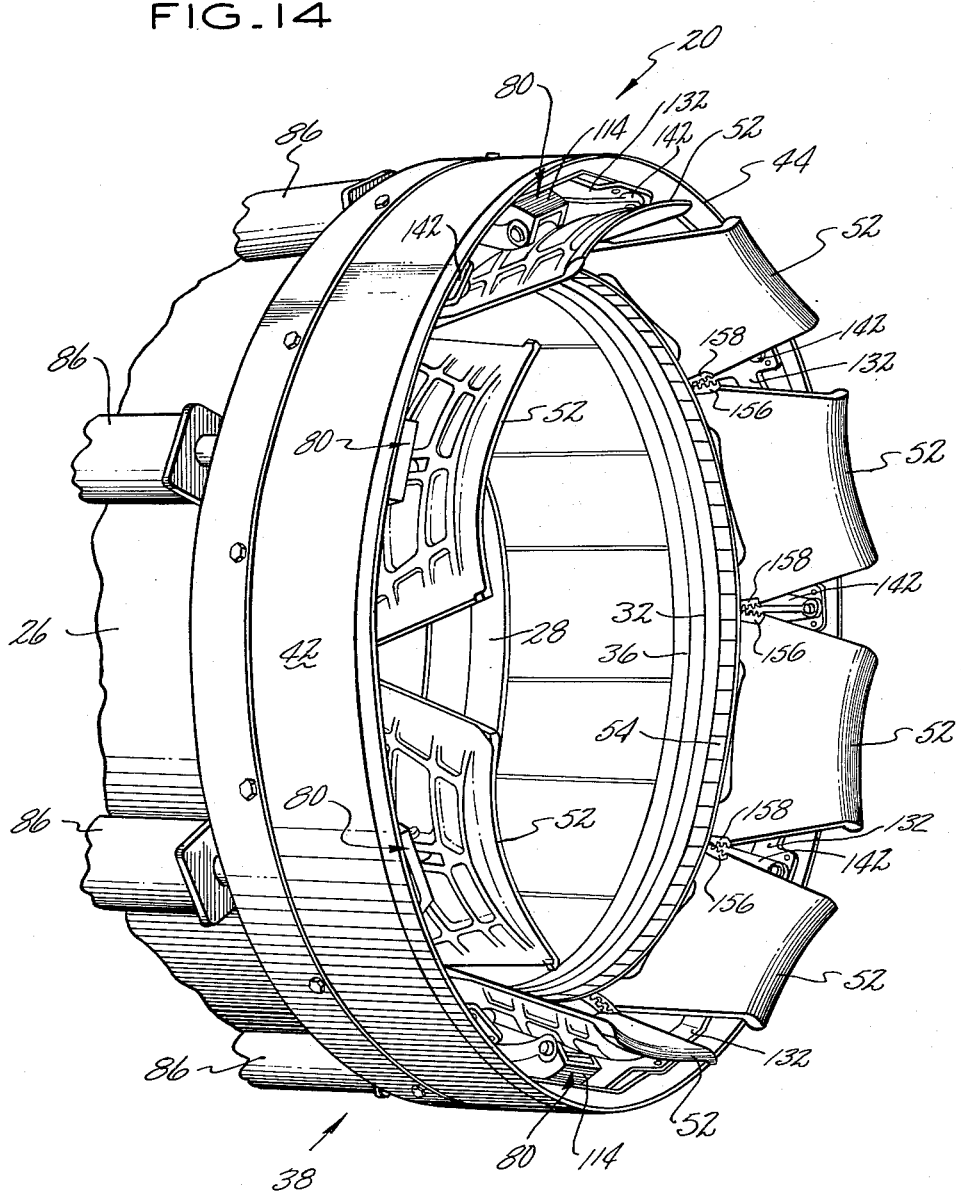
FIG. 14 is a perspective showing of the exhaust nozzle with the flaps open.

Referring to FIG. 1 we see modern aircraft jet type engine 10 which may be of the type fully disclosed in U.S. Patent Nos. 2,711,631 and 2,747,367. Engine 10 comprises compressor section 12, burner section 14, turbine section 16, afterburner 18, which may be of the type fully disclosed in U.S. Patent Nos. 2,735,262, 2,819,587, 2,846,841 and 2,846,842 and our exhaust nozzle 20. Engine 10 is preferably of circular cross section and concentric about axis 22.

In operation, air enters the inlet 24 of engine 10, is compressed in passing through compressor section 12, has heat added thereto in passing through burner section 14 and has energy extracted therefrom to drive compressor section 12 while passing through turbine section 16. The engine gases, after leaving turbine 16, enter afterburner section 18 where they are re-heated as fully disclosed in the above-mentioned afterburner patents and discharged to atmosphere in a thrust-generating function through our variable area exhaust nozzle 20.

As best shown in FIG. 2, our variable area exhaust nozzle 20 comprises afterburner duct 26, which together with the remainder of exhaust nozzle 20, is of circular cross section and concentric about axis 22. Afterburner duct 26, which may include cooling liner 28, defines fixed outlet 30 through which the engine exhaust gas must pass. Strengthening ring 32 may be attached to the afterburner duct 26 by any convenient connecting means such as nut and bolt arrangement 34 and serves to strengthen duct 26 and to strengthen and support liner 28 while defining regulating ports such as 36 through which the cooling air which may be provided from any convenient source such as a compressor 12 and which passes between cooling liner 28 and afterburner duct 26 is discharged with the engine exhaust gases through outlet 30.

Our exhaust nozzle 20 further includes fixed nozzle member 38 which is radially spaced from duct 26 and extends from and axially downstream thereof and which has smooth inner surface 40 which diverges with respect to axis 22 and smooth outer surface 42 which converges with respect to axis 22 and which joins inner surface 40 at circular outer 44 to define a second fixed exhaust outlet. Nozzle fixed member 38 has flexible and radially inward directed flange 46 extending inwardly from the outer wall 42 thereof and further has flexible flange 48 positioned axially forward of flexible flange 46 and which is also positioned by the outer wall 42. It will hereinafter be shown that the exhaust nozzle will be flexibly supported from afterburner duct 26 through actuating mechanism soon to be described by connection to flexible flanges 46 and 48. It will be noted that fixed nozzle member 38 is spaced radially from afterburner duct 26 to define an annular space 50 therebetween through which cooling air, such as ram air, may pass over the flap supporting and actuating apparatus immersed therein.

A plurality of pivotal flaps 52, preferably eight, are positioned circumferentially about fixed outlet 30 and are sealably connected thereto through flexible seal ring 54 which may comprise a plurality of abutting and flexible fingers attached to duct 26 through rivets 56. Flaps 52 may be pivoted to an inner pivot position as shown in solid lines in FIGS. 2 and 3 wherein the inner surface 58 thereof defines a convergent exhaust nozzzle with duct 26. It will be noted as best shown in FIG. 3 that with flaps 52 in their inner pivot position, their side surfaces such as 60 and 62 are in abutting relation so as to prevent the flow of exhaust gas therebetween and that the after end of the inner surface 58 thereof defines convergent exhaust nozzles throat 64. Flaps 52 may also be pivoted to their outer pivot position shown in phantom in FIG. 2 wherein the inner surface 58 thereof extends between the after end of duct 26 and the forward end of the inner surface 40 of fixed member 38 to cooperate therewith to define a convergent-divergent exhaust nozzle having throat 30 and maximum outlet area 44 such that surfaces 58 and 40 define a continuous divergent expansion surface against which exhaust gas may expand in a thrust-generating fashion. It will further be noted that with flaps 58 in their inner position, cooling air is free to pass through annular space 50 but that with flaps 52 in their outer pivot position, this cooling gas passage is restricted such that the only flow is between and around flaps 52.

Flaps 52 are pivotally connected to fixed member 38 in a fashion to be described hereinafter and are caused to pivot inwardly and outwardly to and between their solid line and phantom line FIG. 2 positions by the co-action of pressurized cylinder piston arrangement 66, preferably one for each flap, and linkage arrangement 68, which includes expandable links 70 and 72, which are pivotally connected by any convenient connecting means but preferably by shaft 74 passing therethrough which also serves as a journal for the rollers of roller unit 76. Roller unit 76 bears against and co-acts with contoured cam surface 78 of cam mechanism 80. A retaining plate 82 is connected to cam mechanism 80 by any convenient means such as connecting mechanism 84 (as shown in FIG. 11) to retain the rollers of roller unit 72 within cam mechanism 80 and against contoured surface 78 thereof. As roller unit 76 is caused to move forwardly and rearwardly along cam surface 78 by actuating cylinder mechanism 66, flaps 52 are caused to pivot inwardly and outwardly due to the co-action of links 70 and 72.

Actuating cylinder-piston unit 66 comprises actuating cylinder 86 with double acting piston unit 88 therein. As best shown in FIG. 12, cylinder-piston unit 66 is pivotable about pivot pins 90 and receives actuating fluid through either line 92 or 94 to cause double acting and double piston unit 88 to reciprocate. When actuating fluid enters through line 92, it enters port 96 and flows therefrom into actuating chamber 98 and through passage 100 into actuating chamber 102 so that the actuating fluid is acting against both pistons 104 and 106 to cause link unit 68 to force roller unit 76 rearwardly, thereby causing flaps 52 to pivot to their inner or solid line FIG. 2 or FIG. 3 or FIG. 13 positions. When actuating fluid enters through line 94, it enters cylinder piston unit 66 through aperture 108 and enters chamber 110 only so that roller unit 76 is pulled forwardly along contoured surface 78 by linkage unit 68 to cause flaps 52 to pivot to their outer or phantom FIG. 2 position. It will therefore be noted that while actuating cylinder-piston unit 66 is double acting, it has a higher actuating force available to close the exhaust nozzle, that is, to cause flaps 52 to pivot inwardly against the force of the exhaust gases than is available and necessary to cause flaps 52 to pivot outwardly with the aid of the exhaust gas pressure.

Cam mechanism 80 is part of spaced plate unit 112 which attaches to flexible flange 46 through flared flange 114 which includes bolt holes 116 and 118 and which attaches to flange 46 by any convenient connecting means such as nut and bolt units 49 and 51.

At its other end, spaced plate unit 112 consists of spaced plates 120 and 122, each of which is pivotally attached to afterburner duct 26, and more particularly to support frame 124 thereof through nut and bolt arrangements 126 and 128.

Support frames 124 extend axially along duct 26 as best shown in FIG. 10 and are spaced circumferentially thereabout between spaced plate units 112 as best shown in FIG. 9 such that frame units 124 and spaced plate units 112 cooperate to define a support ring or hoop 125 extending circumferentially about after burner duct 26.

It will be noted, as best shown in FIG. 9, that actuating cylinder and piston unit 66 is positioned between the spaced plates 120 and 122 of spaced plate unit 112 and is pivotally attached thereto, as best shown in FIG. 12 by pivot pins 90 such that actuator 66 is capable of pivoting during the actuation of flaps 52. Preferably, an insulating layer 121 is positioned on unit 66.

Flaps 52 are pivotally attached to flap pivot mechanisms 130 each of which, as best shown in FIGS. 3 and 4, is attached to plate member 132 by connecting means such as bolt and nut arrangements 134, 136 and 138. Plate mechanism 132 extends between flanges 114 of double plate units 112 and are alternately positioned therewith circumferentially about fixed nozzle member 38 and are connected to unit 112 by nut and bolt mechanisms 49 and 51 such that plate members 132 and spaced plate members 112 form a continuous hoop 113 around fixed nozzle member 38, which hoop is attached to flexible flange 46 by bolts 49 and 51 and to flexible flange 48 by a slide fit connection, as best shown in FIG. 5.

Flap pivot mechanism 130 consists of two members, 140 and 142, which are joined through nut and bolt arrangements 144, 146 and 148. Pivot mechanism 130 is split into two parts 140 and 142 to permit the reception in spherical socket 150 thereof, of spherical journal 152, which receives pivot pins 154 of gear plates 156 and 158, which gear plates also include pilot pins 160 and 162, which are received in recesses in the flanged side surfaces 62 and 60 of adjacent flaps 52. In this fashion, flaps 52 are pivotally attached to flap pivot unit 130 which is in turn attached to support ring 113, which is formed by plate units 132 and spaced plate units 112, and which is also attached to the fixed nozzle member 38. Fitted member 67 joins unit 130 to flanges 46 and 48.

Gear plate units 156 and 158 carry mating gears 164 and 166 which perform the function of causing unitary pivot action between the plurality of flaps 52.

In view of the description just completed, it will be obvious to those skilled in the art that nozzle fixed member 38, flaps 52, flap pivotal units 130, actuating mechanism 66 and all related parts are flexibly supported from duct 26 by spaced plate units 112 which are pivotally attached to duct 26 at support ring 125 and which are flexibly connected to member 38 by support ring 113. In view of this flexible support connection, relative thermal growth is permissible between the extremely hot duct 26 and the exhaust nozzle 20, which exhaust nozzle operates in a much cooler region due to the passage of cooling air thereover. Further, exhaust nozzle 20 may be removed from engine 10 merely by disconnecting the 16 bolts 126 and 128.

It is to be understood that the invention is not limited to the specific embodiment herein illustrated and described but may be used in other ways without departure from its spirit as defined by the following claims.

We claim:

1. In a jet engine variable area exhaust nozzle, an exhaust duct defining a fixed outlet, a plurality of pivotable flaps detached from and positioned substantially equally about said fixed outlet, means pivotally attached to said duct and pivotally supporting said flaps to permit inward and outward pivotal movement thereof to define a variable area exhaust outlet, means connecting said flap supporting means to form a ring therewith around said flaps, a fixed member enveloping said ring, and flexible means connecting said fixed member to said ring so that said fixed member, said flaps and said ring are supported in suspended relation from said duct.

2. In a jet engine variable area exhaust nozzle, an exhaust duct defining a fixed outlet, a plurality of pivotable flaps detached from and positioned circumferentially about said fixed outlet, ring shaped support means encircling and supporting said flaps, a plurality of flap actuating mechanisms circumferentially positioned about and pivotally attached to said duct and also attached to said ring shaped support means thereby supporting said support means and said flaps in suspended pivot relation from said duct and constituting the sole support for said flaps and said flap support means, a fixed member enveloping said ring shaped support means, flexible means connecting said fixed member to said ring shaped support means so that said fixed member, said flaps and said ring shaped support means are supported in suspended relation from said duct and a plurality of flap actuating cylinders pivotally attached to said flap actuating mechanism and to said flaps to cause inward and outward pivotal movement thereof to define a variable area circular exhaust outlet.

3. A jet engine variable area exhaust nozzle of substantially circular cross section and concentric about an axis comprising, an exhaust duct of substantially circular cross section defining a fixed outlet, a fixed nozzle defining ring member radially spaced from, encircling and extending from and axially downstream of said fixed outlet and including a smooth outer surface converging toward said axis and a smooth inner surface diverging from said axis shaped and located such that an annular space is defined between said duct and said fixed member, a radially inwardly directed, flexible flange attached to said fixed member, a plurality of pivotable flaps positioned substantially equally about said fixed outlet, means pivotally supporting and actuating said flaps to permit inward and outward pivotal movement thereof to define a variable area exhaust outlet so that said flaps define a convergent exhaust nozzle with said duct when in their inner pivot position with said annular space unrestricted thereby and further so that said flaps extend between said fixed outlet and said fixed member inner surface to define a convergent-divergent exhaust nozzle therewith while blocking said annular space when in their outer pivot position, said support and actuating means comprising a plurality of spaced plate members pivotally attached to and circumferentially positioned about said duct and attached to said flange so that said fixed member is pivotably supported from said duct, each of said spaced plate members comprising spaced plates which are joined at the end attached to said flange to define a contoured cam, double acting cylinder-piston actuating units positioned between and pivotally attached to said plates, linkage mechanism joining said actuating units to said flaps and comprising at least two links, connecting means pivotally connecting said links and including a roller unit contacting said cam, first means connecting said spaced plate units to said flange, second means pivotally connecting said flaps to said flange, third means connecting said first and second means so that they form a support ring encircling said flaps, said cam and said roller unit and means attached to said flaps and said second means to cause said flaps to pivot in unison.

4. In a jet engine variable area exhaust nozzle, a duct defining a fixed exhaust gas outlet, a plurality of movable flaps positioned about said outlet, first means constituting the sole support for said flaps and including ring shaped support means supporting and actuating said flaps for movement to define a variable area exhaust outlet, and second means constituting the sole support for said first means and being pivotally connected to said duct and connected to said first means thereby supporting said first means and said flaps in suspended fashion from said duct.

5. In a jet engine variable area exhaust nozzle, a duct defining a fixed exhaust outlet, a plurality of movable flaps positioned about said outlet, means forming a hoop around said flaps and including means to support said flaps for movement to define a variable area outlet, and easily detachable means pivotally attached to said duct and flexibly supporting said hoop means and said flap support means and constituting the sole support for said flaps, said hoop means and said flap support means.

6. In a jet engine variable area exhaust nozzle, a duct having a support ring thereabout and defining a fixed exhaust outlet, a plurality of movable flaps detached from and positioned about said outlet, means forming a hoop around said flaps and including means to support said flaps for movement to define a variable area outlet, and easily detachable means pivotally attached to said support ring and flexibly attached to said hoop means so that said flaps and hoop means are pivotally supported solely from said support ring.

7. In a jet engine variable area exhaust nozzle which is generally of circular cross section and concentric about an axis, an exhaust duct defining a fixed circular outlet, a plurality of pivotable flaps detached from and positioned circumferentially about said fixed outlet, flap support and actuating means comprising a support ring enveloping said flaps, and plate members attached to and extending from said support ring and pivotally attached to said exhaust duct so that said flap support and activating means are suspended from and pivotally supported solely by said exhaust duct.

8. Apparatus according to claim 7 wherein said flap support and actuating means also comprises a plurality of actuating pistons positioned circumferentially about and pivotally connected to said exhaust duct.

References Cited by the Examiner

UNITED STATES PATENTS

| | | | |
|---|---|---|---|
| 2,714,285 | 8/1955 | Geary | 60—35.6 |
| 2,831,319 | 4/1958 | Geary | 60—35.6 |
| 2,874,538 | 2/1959 | Lauchen | 60—35.6 |
| 2,926,491 | 3/1960 | Hyde | 60—35.6 |
| 2,928,234 | 3/1960 | Brown | 60—35.6 |
| 2,931,169 | 4/1960 | Glenn | 60—35.6 |
| 2,984,068 | 5/1961 | Eatock | 60—35.6 |
| 3,032,974 | 5/1962 | Meyer | 60—35.6 |

MARK NEWMAN, *Primary Examiner.*

RALPH D. BLAKESLEE, *Assistant Examiner.*